Dec. 3, 1968        J. V. BAATRUP        3,414,694

COMPENSATED THERMALLY-RESPONSIVE AUTOMATIC CONTROL SYSTEM

Filed Oct. 19, 1966

United States Patent Office 3,414,694
Patented Dec. 3, 1968

3,414,694
COMPENSATED THERMALLY-RESPONSIVE
AUTOMATIC CONTROL SYSTEM
Johannes Vagn Baatrup, Sonderborg, Denmark, assignor to Danfoss A/S, Nordborg, Denmark, a company of Denmark
Filed Oct. 19, 1966, Ser. No. 587,758
Claims priority, application Germany, Oct. 19, 1965, D 48,453
7 Claims. (Cl. 337—1)

ABSTRACT OF THE DISCLOSURE

An automatic thermally-responsive control apparatus comprising a two-position switch for controlling two operative conditions of a controlled circuit. A compensator bimetallic sensor cyclically actuates the switch in response to impulsing, and therefore heating, of a heating element in a heating circuit, in which another bimetallic sensor operative jointly with the compensator sensor and responding to heat from the heating element controls a switch in the heating circuit and determines the overall number of the impulsing cycles.

---

This invention relates generally to automatic control apparatus and more particularly to compensated thermally-responsive automatic control systems.

Thermally-responsive actuators controlling operators for controlling controlled circuits are well known. Some of these apparatus are compensated to eliminate the influence of ambient temperature on the control operator or its effect on the controlled operation. The control circuits of known devices make use of switches, valves, optical indicators, acoustical signaling devices, or some other "tripped device" which is "triggered" upon attainment of a critical or preselected temperature. Furthermore, the known thermally-responsive control devices may control a control circuit without the effect or influence of ambient temperature on the controlled operation. Compensation takes place by one thermally-responsive element and another thermally-responsive element "trips" or "controls" a control circuit effective to disconnect the entire apparatus.

Many installations of such devices use, for example, a bimetallic sensor or element as an actuator while another bimetallic sensor or element fuctions as a compensator. Since the compensator does not compensate sufficiently in some apparatus and since the attainment of a predetermined critical temperature may damage the apparatus upon reaching a critical temperature the bimetallatic actuator may carry out the function of disconnecting the entire apparatus.

It is a principal object of the present invention to provide a new and simplified automatic thermally-responsive control apparatus capable of simplification of "excess temperature" control tripping of the apparatus.

Another object of the present invention is to provide a new and improved thermally-responsive control device that can be "programmed."

Still another object of the present invention is to provide a thermally-responsive timing device with variable timing carried out by a simple change in sequence of impulse application to a heat or temperature source.

A feature of the control device in accordance with the invention is the provision of a thermally-controlled actuator responsive to heat from a heat source. The actuator is constructed as a bimetallic element cooperative with a bimetallic compensator, both of which are interconnected, and pivotally arranged in a configuration in which the actuator carries out initiation of the control of a two-position operator to a first position and the compensator takes care of sequence cycling of the control operator within an overall period or cycle established by the actuator which carries out a disconnect function of the controlled circuit or of the control device by disconnecting or de-energizing the heat source of the apparatus.

The device of the apparatus has the bimetallic actuator and compensator located pivotally about a fixed point or center of rotation so that the various control and tripping devices can be accurately correlated to the movement of the actuator and compensator.

A heat source is provided in the control apparatus which can be energized to carry out a "programmed" or repeated switching operation. The thermal parameters of the system, as well as the position of the heat source relative to both bimetallic elements, may be so chosen that the apparatus can be "programmed" so that after termination of supply impulses the metallic compensator attains the same temperature as the bimetallic actuator and the apparatus or system is cut-off.

The apparatus is capable of carrying out cyclical operation of a two-position operator, for example a switch, by impulsing the heat source so that operation takes place in one direction to one of the operative positions of the operator and an operation takes place in the opposite direction or to the other position after the supply electrical impulse has terminated. Thus, the programmed unit or apparatus may carry out control of functions of devices such as a washing machine and the like.

The arrangement of the apparatus provides for cyclical operation of a two-position operator, for example a switch actuated to an "on" and "off" condition, with provision being made therein to limit the number of cycles by a temperature-responsive cut-off element or actuator which actuates an electrical switch, in series with a heat source which itself provides the temperature control of the actuator. Thus, the actuator may be automatically switched "on" or "off" several times and establish overall cycles within which the compensating element connected therewith can carry out other cyclical control of a controlled circuit by operating a two-position operator, for example a switch, between two operative positions. The apparatus may thus carry out cyclical operations, one being an overall cycle control operation, and the timing of the cycles can be varied and made independent of each other. For example, the overall apparatus can be cut off or tripped at a predetermined number of timing intervals or cycles within a given overall cycle or period, for example an overall thirty minute cycle and the compensator can, for example, define two minute intermediate cycles within the overall period or cycle.

Other features and advantages of the control apparatus, in accordance with the present invention, will be better understood as described in the following specification and appended claims, in conjunction with the following drawings in which:

Figure 1:
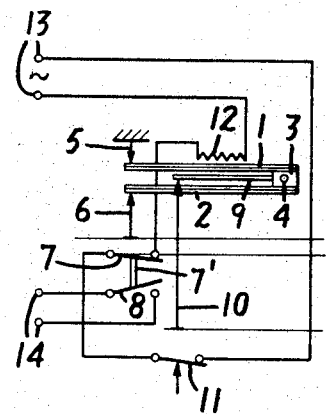
FIG. 1, is an overall diagram of a control device in accordance with the invention illustrated in its initial starting position.

As illustrated in the drawing the control device in accordance with the invention comprises a bimetallic actuator 1 and a bimetalic compensator 2 both of which will bend in a same direction and sense upon sensing of heat or application of heat thereto. The two bimetallic elements are interconnected through an interconnecting bearing element 3 pivoted about a fixed pivot 4. The ends, remote from bearing 3, of the two bimetallic elements are free so that they may bend as illustrated in the drawing and hereinafter described. A free end portion of the bimetallic actuator 1, remote from the element 3, bears against a fixed stop 5 as illustrated in FIG. 1. A free end portion of the bimetallic compensator 2 actuates a plunger or button 6 of a switch comprising a two-position operator 7' which has a contact 7 normally in a closed position and has a normally open contact 8. As hereinafter described this two-position operator 7' controls a controlled circuit, not shown, or operation through the two contacts 7, 8.

An actuating lever 9 is connected to the bearing element 3 and pivots proportionately with the angular movement of the bearing 3 as later explained. That is to say the angular rotation of the bearing 3 by the actuator 1 will move the lever 9 through similar angular rotation as well as rotating the compensator 2 through the same angle. The actuating lever 9 has a free end portion which actuates a plunger 10 for operating a switch 11. The plunger 10 is actuated by the lever 9 for actuating the switch contact 11 in only one direction, namely an open position in the example of the invention illustrated.

The contacts 7 and 11 of the two-position operators or switches are connected in series with a heating element 12 to which an alternating current is applied through input terminals 13 from an alternating current source, not shown. Terminals 14 are connected to the two-position operator 7, 8 to connect thereto a controlled circuit, not shown, to be controlled by the control device of the invention. The contacts 7 and 8 are biased in known manner to the position illustrated in FIG. 1 and the operator or plunger 6 operates to one operative position while the biasing means, not shown, restores it to the initial position or condition. The contact 11 may be reset automatically once opened, however, preferably a deliberate manual reset arrangement, not shown, is provided in known manner for resetting the contact 11 mnaually to a closed condition illustrated in FIG. 1 once it has been opened as hereinafter explained.

The contacts 7, 8 controlling the controlled circuit, not shown, are actuated in dependence upon a temperature difference between the two bimetallic elements 1, 2 and the contact 11 is actuated in dependence upon the ambient temperature sensed by the bimetallic element 1. Accordingly, the contact 11 can be thought of as an operator or tripping switch operated in response to excess temperature relative to a control temperature, a temperature difference, which is the temperature by which the control circuit is controlled.

Figures 2, 3, 4:
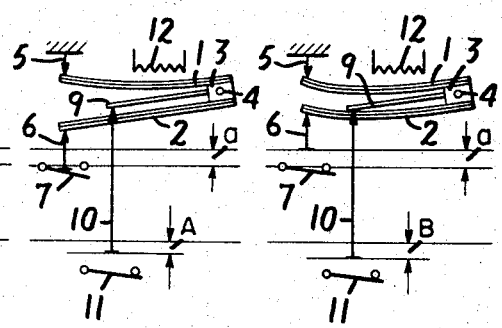
FIG. 2, is a fragmentary diagrammatic illustration of the apparatus in FIG. 1, and illustrates a condition in which a first energy impulse has been applied to a heat source therein.
FIG. 3, is a fragmentary diagrammatic illustration of the apparatus in FIG. 2 in a different operative condition of operation.
FIG. 4, is a fragmentary diagram of the apparatus illustrated in FIG. 3 in a different operative condition and illustrates the apparatus when the $n$th energy impulse to a heat source has been applied thereto and the apparatus is "tripped out" or cut-off.

As can be seen in the drawing when the contact or switch 11 is in a closed position a circuit is established to the resistance element 12, constituting the heat source, for providing electrical energization from the input terminals 13. It will be remembered that the control contact 7 is normally closed. The bimetallic actuator 1 is, therefore, heated and thence, with its free end bearing against the stopper 5, by virtue of the bending thereof will rotate the interconnecting and bearing element 3 about the fixed pivot 4 an angular distance corresponding to a linear distance $a$. When the actuator is bent in this manner the bimetallic compensator 2 is rotated by virtue of its interconnection to the actuator 1 and the plunger 6 is made to move a distance $a$ and opens the contact 7 and closes the other contact 8. During the angular movement of the compensator 2 the arm or lever 9 is also angularly rotated and the plunger 10 is displaced an effective linear distance A as illustrated in FIG. 2.

Since the contact 7 has been opened because of the heating and bending of the actuator 1 the heating circuit or energization circuit to the heat source 12 is broken and the element 12 ceases to radiate heat and begins to cool off. Thus, a first impulse to the heat source is terminated. Due to the stored heat in the bimetallic actuator 1 it continues to bend still more so that after a certain time delay, depending upon the thermal parameters of the system and the position of the heat source relative to the two bimetallic elements, the continued bending movement of the bimetallic actuator 1 causes the bearing 3 to be rotated sufficiently so that the plunger 10 again moves through a distance as before to an overall distance B. However, the compensator 2 has been heated during this period so that it too bends in the same sense or direction as the actuator 1 thereby retracting the plunger 6 associated therewith allowing the contact 7 to be closed and its corresponding interconnected contact 8 to be opened so that the controlled circuit is opened and the heating circuit is closed. The elements have therefore assumed a second "neutral" position illustrated in FIG. 3 at a higher temperature level than a first "neutral" or initial position illustrated in FIG. 1. In this "neutral" position the contacts 7 and 8 have operated to the other or initial operating position of the two-posiltion operator so that the on-off switch conditions of the initial position in FIG. 1 exist. Thus, a predetermined time or operation cycle consisting of a predetermined "off" and a predetermined "on" period will be derived across the output terminals 14 to which the controlled circuit is connected.

The closing of the contacts 7 completes a circuit to the heating source 12 as before described so that the cycle is repeated and the bimetallic actuator 1 will bend until the plunger 6 or connecting element traverses the operating stroke distance $a$ actuating the contacts 7, 8 as before. When this new heating impulse has terminated a "neutral" position is gained also at a higher temperature level than the second "neutral" position. The switching steps are repeated until when the $n$th impulse is applied to the heat source 12 the ambient temperature of the bimetallic actuator 1 is increased to such an extent that the plunger 10 is actuated through the linear distance H so that the contact 11 is opened. This will interrupt the circuit to the heating source 12 and the whole system is switched off and the cycle sequence is terminated. Eventually the bimetallic elements will cool and the plungers retracted and the system is then in its normal starting position so that it is in the condition illustrated in FIG. 1, however, with the contact 11 open. When the contact 11 is again closed or reset manually to the position in FIG. 1 the system will be available for a new program.

Those skilled in the art will understand that the contact 11 may be arranged in such a way that heating element 12 as well as the control circuit at terminals 14 can be disconnected by the operation of the contact 11 to an open position. Moreover, the contact 7 may be a contact in which in one position as illustrated it applies a voltage to theh eat source 12 and in what is described as an open position herein is another position applying a voltage across a device to be controlled or operated. Moreover, it can be seen that the program can be varied by the thermal parameters of the system.

While a preferred embodiment of the invention has been shown and described it will be understood that many modifications and changes can be made within the true spirit and scope of the invention.

What I claim and desire to secure by Letters Patent is:
1. An automatic control apparatus comprising, in combination, a two-position first control operator having means operable to two operative conditions for controlling a first controlled circuit to two operative conditions, connections connecting said first controlled circuit means to said first control operator, an electrically energized source of heat, a second controlled circuit means for electrically energizing said source of heat, actuator means comprising a first bimetallic sensor pivotally mounted disposed sensing heat from said heat source and responsive to heat from said source, compensator means comprising a second bimetallic sensor interconnected with said first bimetallic sensor pivotably mounted to move in conjunction with angular rotation of said first bimetallic sensor and disposed to sense heat from said source at a lower temperature than said first bimetallic sensor effective to actuate said first two-position operator cyclically for a predetermined number of cycles, and a second two-position operator connected in series with said second control circuit and under control of said first bimetallic sensor determining the overall number of said cycles.

2. An automatic control apparatus according to claim 1, in which said two-position operator comprises means to apply energizing impulses to said heat source to cause said second bimetallic sensor to actuate said first control operator to operate to one of said operative positions and the absence of an impulse to operate to another of said operative positions.

3. An automatic control apparatus according to claim 1, in which said two-position first control operator comprises a first switch operable to two operative positions corresponding with said conditions.

4. An automatic control apparatus according to claim 3, in which said first switch is in series with said source of heat and in which one of said operative positions comprises a position in which said switch is electrically in circuit with said source of heat.

5. An automatic control apparatus according to claim 1, in which two-position first control operator comprises a first switch operable to two-operative positions in one of which said switch is in circuit with said source of heat and in the other operative position said switch is out of circuit with said source of heat and the last-mentioned circuit is interrupted.

6. An automatic control apparatus according to claim 1, in which said second two-position operator comprises a switch operable to turn off said apparatus when a limit temperature sensed by said second bimetallic sensor obtains.

7. An automatic control apparatus according to claim 1, in which said first and second sensors comprise bimetallic strips bendable in common directions, and including means cooperative with said sensors operating said operators respectively.

References Cited

UNITED STATES PATENTS

| | | | |
|---|---|---|---|
| 2,195,947 | 4/1940 | Uhlrig | 200—122 |
| 2,379,602 | 7/1945 | Stickel | 200—113.10 |
| 2,748,223 | 5/1956 | Frank | 200—122 |
| 3,003,086 | 10/1961 | Strobel et al. | 200—122 |

BERNARD A. GILHEANY, *Primary Examiner.*

R. COHRS, *Assistant Examiner.*